United States Patent Office 3,530,006
Patented Sept. 22, 1970

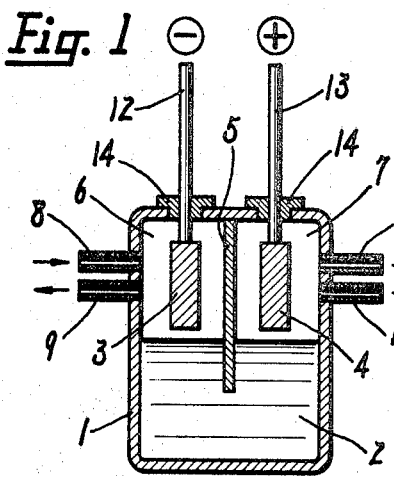
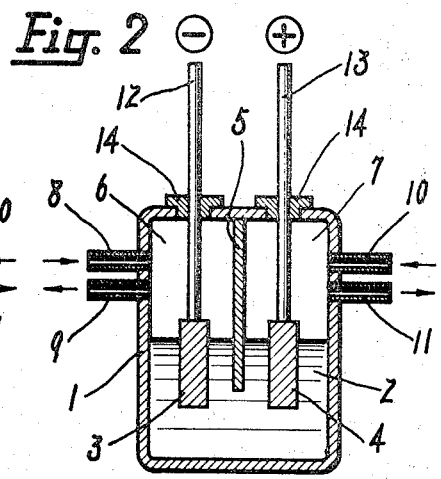
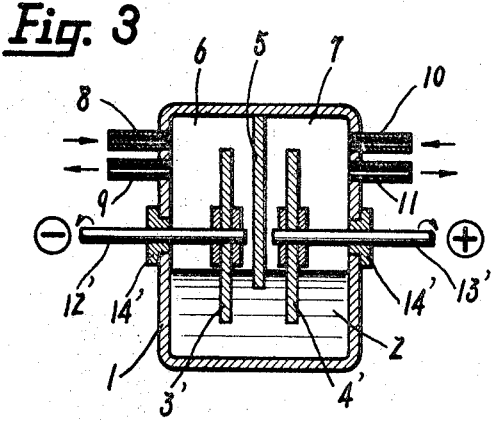
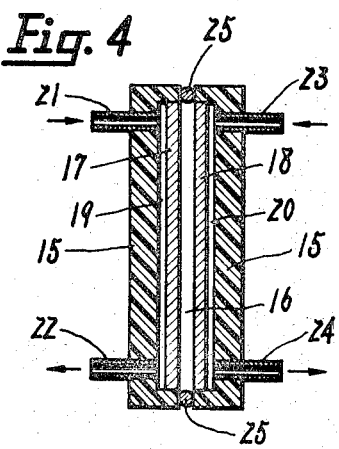
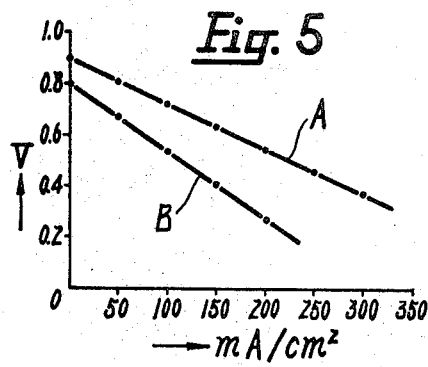
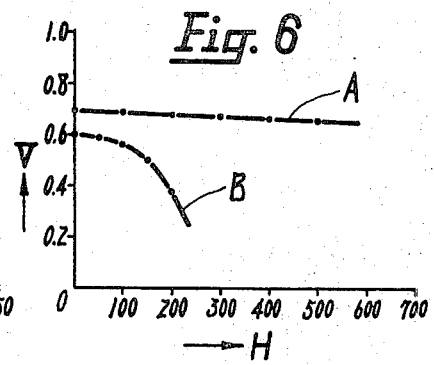

3,530,006
FUEL CELL WITH METALLIC OXIDE FUEL AND OXIDIZING ELECTRODES
Shoji Makishima, 115 1-chome, Kamitakaido, Suginami-ku, Tokyo, Japan; Hidefumi Hirai, 2122 4-chome, Kamimeguro, Meguro-ku, Tokyo, Japan; and Kazuo Tomiie, 4 5-chome, Aoyama - Minamicho, Akasaka, Minato-ku, Tokyo, Japan
Continuation of application Ser. No. 492,434, Oct. 4, 1965. This application Aug. 29, 1969, Ser. No. 857,625
Claims priority, application Japan, Nov. 26, 1964, 39/66,742
Int. Cl. H01m 27/04
U.S. Cl. 136—86                                    3 Claims

ABSTRACT OF THE DISCLOSURE

A fuel cell is disclosed in which the electrodes are movable alternately between an electrolyte to produce an electromotive reaction and either an oxidizer or fuel to oxidize or reduce the electrode material. The electrode itself is composed of metal oxides obtained by sintering at a high temperature a metal oxide of variable atomic valency and at least one component taken from the group consisting of alkali, alkaline earth, Zn, Cd, Ag, Al, Mg, Ja, In, rare earth, Si, Ge, Sn, Sb, Pb, As, Bi, Se and Te.

---

This application is a continuation of application Ser. No. 492,434, filed Oct. 4, 1965, now abandoned.

This invention relates to a fuel cell. The fuel cell of a conventional type is of so-called three-phase contact mechanism by which three elements in the form of electrode, electrolyte and reaction gas are simultaneously brought into contact with one another either on the surface or on the inside of the electrode, thereby to effect an electromotive reaction. This mechanism involves the necessity of causing the reaction side of a porous electrode to contact with an electrolyte and supplying a reaction gas from the opposite side thereof, thereby making a regulation between the osmotic pressure of the electrolyte and the pressure brought about relative to the gas supplied and in consequence the electrode is strictly limited in porosity and the size of micropores. Supposing, for instance, an electrode having 50% porosity and micropores with a diameter of 1–5 microns is made and the pressure brought about by supply of gas is strictly regulated, part of the gas blows off to the electrolyte side and in consequence part of the electrolyte passes through the gas chamber side. Hence, the electrode is readily reduced in its efficiency and in turn greatly shortens its service life, failing to fully achieve the primary object of a fuel cell. Furthermore, the material of the electrode for use in the fuel cell of electromotive reaction system based on three-phase contact mechanism of a conventional type is limited in porosity and micropores, and so carbon, nickel, silver or the like have been used as the materials suitable therefor. In the case of nickel, for example, a porous electrode has been obtained by sintering very fine powders of nickel to a temperature of 700–800° C. And in the case of carbon a method has been employed of mixing very fine powders thereof with a suitable binder and pressing and then sintering in like manner. The methods described above are all well known.

This invention provides an epoch-making process for eliminating all the drawbacks described above. That is to say, an electromotive reaction system based on the three-phase contact mechanism is not employed but the electrode is moved in both longitudinal and bilateral directions or revolved in such a manner that when an electrode is in a gas phase—if it is a fuel electrode, a chemical reaction of the electrode (solid phase) with fuel (gas phase) brings the fuel electrode into reduction and when the electrode is in an electrolyte, an electrochemical reaction of the electrode (solid phase) with the electrolyte (liquid phase) brings the fuel electrode into oxidation. In the case of an oxygen electrode in like manner, the electrode effects an oxidation reaction in the gas phase of an oxidizer and an electromotive reaction in an electrolyte. That is to say, two-phase contact is divided into two steps of process by the repetition of which electricity is generated. Thus, since it can dispense with a difficult reaction system in the form of simultaneous contact of an electrode, an electrolyte and a reaction gas with one another such as was necessary in the case of the electromotive reaction system based on the three-phase contact mechanism, an electrode is free from any strict restriction in porosity and the size of micropores. In addition, the fact that the electrode is free from restrictions presents a marked feature of allowing a free choice in materials for use as an electrode.

An object of this invention is to provide a fuel cell of high efficiency which works by all kind of fuel including hydrocarbons.

Another object of the invention is to provide a fuel cell having duration and a long life.

Explanation of preferred embodiments of the invention will be made with reference to the accompanying drawings in which:

FIG. 1 is a longitudinal sectional view of a fuel cell according to the invention, showing a state of an electrode before the electrode being immersed in an electrolyte i.e. a process through which a fuel electrode undergoes a chemical reaction by fuel, being brought into reduction and through which an oxygen electrode undergoes a chemical reaction by an oxidizer, being oxidized;

FIG. 2 shows a state of the electrode in FIG. 1 being immersed in the electrolyte, in which state the fuel electrode is oxidized and the oxygen electrode is reduced through an electrochemical reaction, thereby to give electric energy outside;

FIG. 3 is a modification, shown in longitudinal sectional view, of the fuel cell according to the invention;

FIG. 4 is a longitudinal sectional view of a fuel cell typical of the three-phase contact system heretofore in use;

FIG. 5 is a curve illustrating by discharge voltage (V) and density of discharge current (ma./cm.$^2$) a comparison of numerical value between the efficiency of the fuel cell of the invention and that of the conventionally known type of fuel cell shown in FIG. 4; and FIG. 6 shows a curve illustrating by discharge voltage and discharge period of time a comparison of the service life between the fuel cell of the invention and the conventional fuel cell of typical efficiency.

This invention, which is characterized in that at least one electrode contacts alternately with an electrolyte and fuel or an oxidizer and when in contact with the electrolyte it effects an electromotive reaction and when in contact with the fuel or the oxidizer it reduces or oxidizes, is the product of finding that the application of an electrode material made of metals and metallic oxides suitable for the two-step reaction of the kind described to the formation of electrodes can generate electricity with high efficiency.

Referring now to the drawings, FIGS. 1 and 2 indicates an electromotive reaction being effected by moving electrodes up and down. An electrolyte 2 is poured into an iron-made cell jar 1, said electrolyte being made up of a fused salt of carbonates of sodium, potassium, lithium whose composition is controlled in a mol ratio of 3:3:4. Besides alkali hydroxides, alkali oxides, alkali halides, sulfides, phosphates and mixtures thereof can be used as an electrolyte. When a thick aqueous solution of electrolyte is used as an electrolyte, soluble chlorides, bromides, fluorides, sulfates, phosphates, etc. or one or more mixtures thereof, alkali metal, and alkaline earth metal can be used as the electrolyte. A fuel electrode 3 is made up of silver and copper or of an alloy of silver and copper, or of a mixture of metallic oxides, such as a mixed oxide of zinc, cadmium, gallium, iron, chromium, and aluminium. Preferred fuel electrode materials are Ag and Cu and alloys thereof containing a small amount of Sb, Bi, Sn or Cd. An oxygen electrode 4 is made up of metals such as nickel and a mixture of metallic oxides such as a mixed oxide of nickel, cobalt, iron, manganese chromium, aluminum, beryllium, magnesium, calcium, strontium, barium, etc. The process of manufacture for the above will be described hereinafter. A cell jar 1 is partitioned inside thereof into two right and left compartments 6, 7 by a partition 5 made of the same iron as in the case of the cell jar 1, said partition being designed to allow the electrolyte to communicate with said two compartments. Said partition is provided for the prevention of the fuel for the reducer of the fuel electrode and the oxygen for the oxidizer of the oxygen electrode from getting mixed and starting explosive combustion; the above-described compartment 6 is a gas chamber filled with hydrogen, carbon monoxide, water gas, producer gas, ammonia, hydrocarbon such as methane, ethane, propane, mixtures thereof or other fuel gases to be used as a reducer for the fuel electrode; in addition, liquid reducers such as heavy oil, alcohol, hydrazine or the like may be used: the compartment 7 is an oxygen gas chamber filled with an oxidizer such as air or oxygen and carbon dioxide; besides, liquid oxidizers such as undiluted nitric acid, hydrogen peroxide or the like may be used: the cell jar 1 is provided on one side thereof with an inlet pipe 8 and an outlet pipe 9 for fuel; and on the other side thereof with an inlet pipe 10 and an outlet pipe 11 for an oxidizer; a fuel electrode rod 12 of stainless steel to be used also as a terminal and an oxygen electrode rod 13 of stainless steel to be used also as a terminal are inserted into the cell jar on the upper side thereof. An insulating material 14 is formed of a silica tube which electrically insulates a point of contact with the cell jar 1.

When the electrodes are in an elevated position as shown in FIG. 1, the fuel electrode 3 undergoes reduction through a chemical reaction made with the fuel in the cell jar, and the oxygen electrode 4 effects oxidation through a chemical reaction made with the oxidizer. When the electrodes are in a lowered position as shown in FIG. 2, the fuel electrode 3 effects oxidation through an electrochemical reaction and the oxygen electrode 4 simultaneously effects reduction through an electrochemical reaction. At this time electricity can be led into an outside circuit of the cell. The quantity of electricity to be led outside of the cell varies in proportion to the velocity at which this process is repeated. The results of the test conducted is as shown in the following Table 1.

TABLE 1

| Cycles/min.: | Current density obtained from 0.5 v. discharge voltage (ma./cm.²) |
|---|---|
| 1 | 100 |
| 2 | 125 |
| 3 | 175 |
| 4 | 200 |
| 5 | 165 |

FIG. 3 indicates a fuel cell wherein further improvements are made in efficiency over that shown in FIGS. 1 and 2, and wherein the electrodes revolve continuously and come into incessant contact with the electrolyte phase and gas phase. To suit the purpose the fuel electrode 3' and the oxygen electrode 4' are shaped into the form of a disc adapted to be revolved. The numerals 12' and 13' indicate shafts fitted in the center of a disc-shaped electrode respectively and used also as a terminal of the fuel and oxygen electrodes respectively; 14' indicates as insulating material formed of a silica tube which electrically insulates a point of contact with the cell jar. The results of test conducted on the efficiency of the cell made on the rotary system of the invention are shown in Table 2. The effect of a revolution velocity on the efficiency of the cell indicates that the highest efficiency value was obtained from 10 r.p.m., the higher number of revolution than which rather showed a tendency toward reduction in the efficiency value of the cell.

TABLE 2

| Revolution velocity (r.p.m.) | Current density when 0.5 v. was indicated (ma./cm.²) |
|---|---|
| 1 | 50 |
| 2 | 90 |
| 4 | 175 |
| 6 | 220 |
| 8 | 260 |
| 10 | 275 |
| 12 | 250 |
| 14 | 215 |

According to the conditions required of the test results shown in Table 1, the fuel electrode was made up of ZnO, $Cr_2O_3$, $Al_2O_3$ in a mol ratio of 1:1:0.3. The oxygen electrode was made up of NiO, $Co_2O_3$, MgO, $Al_2O_3$ in a mol ratio of 1:1:1:1. The electrode area was 5 cm. in length, 3 cm. in width and 0.1 cm. in thickness with a lattice structure formed of stainless steel net. The fuel was depended upon commercial propane; the oxidizer upon a mixture of $CO_2$ with $O_2$ obtained commercially from an oxygen bottle in a volumetric ratio of 1:1, and the electrolyte upon a mixture of $Na_2CO_3$, $K_2CO_3$, $Li_2CO_3$ in a mol ratio of 3:3:4, which could actuate the cell at a temperature of 580° C. The conditions required of the test results shown in Table 2 were the same as those of Table 1 except that the electrodes were disc-shaped respectively with a radius of 5 cm. and a thickness of 0.15 cm.

The fuel cell of the invention as described above is designed to work in such a manner that contact of a respective electrode with the electrolyte generates electricity through an electrochemical reaction effected by the contact, and contact of the respective electrode with fuel and an oxidizer reduces and oxidizes the respective electrode through a chemical reaction effected by the contact, namely the repetition of such two steps of process effecting a cell reaction. The process is explained by the following reaction formulas:

Description will be made of an example wherein propane is used as fuel.

Two-phase contact of propane gas with the fuel electrode reduce the electrode through a chemical reaction:

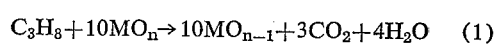

$$C_3H_8 + 10MO_n \rightarrow 10MO_{n-1} + 3CO_2 + 4H_2O \quad (1)$$

Next, two-phase contact of the fuel electrode with the electrolyte oxidizes the electrode through an electrochemical reaction. That is to say,

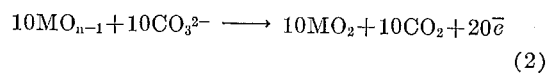

$$10MO_{n-1} + 10CO_3^{2-} \longrightarrow 10MO_2 + 10CO_2 + 20\bar{e} \quad (2)$$

The fuel electrode as a whole is represented by putting the Formulas 1 and 2 together as follows:

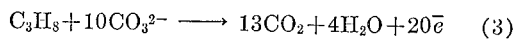

$$C_3H_8 + 10CO_3^{2-} \longrightarrow 13CO_2 + 4H_2O + 20\bar{e} \quad (3)$$

On the other hand, the oxygen electrode makes a chemical reaction through two-phase contact with the oxidizer and is reduced:

$$M'O_m + \tfrac{1}{2}O_2 \rightarrow M'O_{m+1} \quad (4)$$

Next, the oxygen electrode generates electricity through an electromotive reaction made by two-phase contact with the electrolyte and is oxidized. Hence, $$M'O_{m+1} + CO_2 + 2e^{-1} \longrightarrow M'O_m + CO_3^{2-} \quad (5)$$

The oxygen electrode as a whole is represented by putting the Formulas 4 and 5 together as follows:

$$CO_2 + \tfrac{1}{2}O_2 + 2\bar{e} \longrightarrow CO_3^{2-} \quad (6)$$

Hence, the whole cell reaction formula is represented by the Formulas 3 and 6 as follows:

$$C_3H_8 + 5O_2 \rightarrow 3CO_2 + 4H_2O \quad (7)$$

As is understood from the reaction formulas described above, what is required of the electrodes is that, if an electrode is in the case of a fuel electrode, it must be made up of a material not only easy of reduction through a chemical reaction with fuel but also electrochemically easy of oxidation. And what is required of an oxygen electrode is that the electrode is made up of a material not only easy of oxidation through a chemical reaction with an oxidizer but also easy of reduction through an electrochemical reaction. In point of electric potential the fuel electrode is a base potential, and the smaller is a change of free energy when the fuel electrode is reduced by fuel, the higher becomes the efficiency of fuel utility.

Incidentally, M and M' in the above-described reaction formulas represent metallic atoms.

When a metal such as Ag is used in the fuel electrode, the above reaction formula is represented by the following formulas, wherein, through the chemical reaction silver oxide effects with fuel, $$Ag_2O + Fuel \rightarrow 2Ag + nCO_2 + mH_2O \quad (8)$$

is obtained, and then through the electrochemical reaction a silver electrode effects in the electrolyte, $$2Ag + CO_3^{2-} \longrightarrow Ag_2O + CO_2 + 2e^- \quad (9)$$

is obtained, namely a metal of one kind or combined metals besides a mixture of special metallic oxides can be used as an electrode. Besides, Ag and Cu and an Ag-Cu alloy also produced a good experimental result.

Description will be made of electrodes most suitable for the fuel cell of the invention, particularly of those made up of a mixture of metallic oxides in the following, namely the electrodes are obtained by sintering at high temperatures a mixture prepared by suitably combining compounds such as alkali, alkaline earths, Zn, Cd, Al, Ca, In, rare earths, Si, Ge, Sn, Pb, As, Bi, Se, Te, etc. with metallic oxides of variable valency such as Fe, Co, Ni, Mn, Cr, Cu, V, Ti, etc.

Detailed description of the process of manufacture for the fuel electrode of the invention will be made below with reference to an example.

The electrode consists of zinc oxide, chrominum oxide, aluminum oxide in a mol ratio of 1:1:0.3. The sulphate of each metal is weighed to form such a composition, namely 50 g. of zinc sulphate, 140 g. of chromium sulphate and 49 g. of potassium alum are dissolved in one liter of water and neutralized in 800 cc. of dilute ammonia water (about 1 N). The metallic hydroxides thus obtained are washed with water and dried, and thereafter baked for five hours at a temperature of about 1000° C., to yield metallic oxides of ZnO, $Cr_2O_3$. These metallic oxides were found to have a spinel structure at least in part under X-ray analysis. The power of the metallic oxides thus obtained was put in an iron-made mold—4 cm. in length, 2 cm. in width and 0.2 cm. in thickness—placed ready for use and was pressed together with five stainless nets (20 meshes and 0.2 mm. in wire diameter) sandwiched between the powder layers. Pressure intensity of pressing was 500 kg./cm.². The electrode thus formed and released from the mold was subjected to finished baking in the atmosphere of $H_2$ at a temperature of 1050° C. for five hours. The fuel electrode thus obtained in a finished form acquired a grey colour and was mechanically strong.

An example of an oxygen electrode will be described. The electrode consisted of NiO, $Co_2O_3$, Mgo, $Al_2O_3$ in a mol ratio of 1:1:1:1. The process of manufacture operated thereafter was essentially the same as in the case of the fuel electrode except that finished baking was operated in the air.

FIG. 4 indicates the structure of a representative type of fuel cells conventionally known. The numeral 15 indicates a cell jar; 16, an electrolyte; 17, a fuel electrode; 18, an oxygen electrode; 19, a fuel chamber; 20, an oxygen chamber; 21 and 22, inlet and outlet pipes of fuel, respectively; 23 and 24, inlet and outlet pipes of oxygen; and the numeral 25 indicates a gasket for the prevention of gas leakage. The fuel cell of the type described is designed to make an electromotive reaction on the three-phase surface on which an electrolyte, an electrode and gas contact simultaneously with one another. By this it is meant that, in addition to the drawbacks mentioned above, a reaction contact area is limited to the point at which three phases contact with one another, with the result that current to be generated per apparent unit area is also limited. Furthermore, when the fuel cell of the type described is subjected to continued operation, the electrolyte of the cell permeates through the electrodes because of difficulty in balancing pressure between the electrolyte and the gas, thereby to reduce the efficiency of the electrodes and greatly shortens the service life thereof.

A comparison of the numerical value between the results of the test conducted on the fuel cell A of the invention and the typical efficiency of the fuel cell B of a conventional type more plainly speaks of itself.

Diagrams 5 and 6 illustrate the results of comparison made between the two.

Diagram 5 illustrates the cell A of the invention and that B of a conventional type in terms of current density and discharge voltage. The electrode reaction area of the cell B was 25 cm.², the temperature of the cell 625° C., and the discharge voltage thereof was measured when current density was caused to increase by supplying the fuel electrode with propane and the oxygen electrode with mixed gas of air and carbon dioxide. On the other hand, the electrode reaction area of the cell A was 45 cm.², the temperature of the cell was 595° C., and the gas chamber of the fuel electrode was supplied with propane, and the gas chamber of the oxygen electrode was supplied with air containing carbon dioxide. The electrolyte used in both cells A and B was a carbonate solutions of sodium, potassium, lithium in a mol ratio of 3:3:4. As is apparent from the diagram, the cell of the invention can generate stronger current, under the same load voltage, than the cell of a conventional type.

Diagram 6 indicates a comparison of the relation between the discharge time and discharge voltage of the fuel cell A of the invention and those of the fuel cell B of a conventional type. Both the cells A and B were definite in discharge current denisty with 100 ma./cm.². The electrode area and other conditions were the same as in the case of Diagram 5. As apparent from said diagram, the fuel cell B of a conventional type showed that because of its electrodes being fixed, the pores of the electrodes were gradually stopped up by the electrolyte and deteriorated to such an extent that after a lapse of about 200 hours the electrodes were completely deprived of their ability. On the other hand, the fuel cell A of the invention constituted no cause for such deterioration as shown by the cell B because of a difference in reaction mechanism between the two and was assured of a long life.

As described above, the fuel cell provided by this invention is a novel and useful one quite different in idea from the fuel cells heretofore in use. It is to be understood that since various changes and modifications could be

What we claim is:

1. A fuel cell comprising at least one reducing material, at least one oxidizing material, a fluid electrolyte selected from the group consisting of alkali carbonates and alkali halides, a fuel electrode comprising baked metallic oxides consisting of ZnO, $Cr_2O_3$ and $Al_2O_3$ and having a spinel structure at least in part, and an oxidizing electrode comprising baked metallic oxides consisting of NiO, $Co_2O_3$, MgO and $Al_2O_3$, and means mounting at least one of said electrodes to alternately immerse said electrode in the electrolyte and contact one of said reducing and oxidizing materials whereby an electromotive reaction takes place when said electrode is in contact with said electrolyte and the oxidation state of said electrode material is changed when in contact with one of said reducing and oxidizing materials.

2. A fuel cell as claimed in claim 1 wherein said fuel electrode comprises baked metallic oxides consisting of ZnO, $Cr_2O_3$, and $Al_2O_3$ in a mol ratio of 1:1:0.3.

3. A fuel cell as claimed in claim 1 wherein said oxygen electrode comprises baked metallic oxides consisting of NiO, $Co_2O_3$, MgO and $Al_2O_3$, in a mol ratio of 1:1:1:1.

References Cited

UNITED STATES PATENTS

| 3,275,475 | 9/1966 | Cohn et al. | 136—86 |
| 3,300,344 | 1/1967 | Brag et al. | 136—86 |
| 3,377,203 | 4/1968 | Mobius et al. | 136—86 |
| 3,410,728 | 11/1968 | Fullman et al. | 136—86 |

ALLEN B. CURTIS, Primary Examiner

U.S. Cl. X.R.

136—120